United States Patent [19]

Kah, Jr.

[11] Patent Number: 4,878,006
[45] Date of Patent: Oct. 31, 1989

[54] MULTI-VOLTAGE MOTOR AND TIMER CLOCK

[76] Inventor: Carl L. C. Kah, Jr., 778 LakesideDr., North Palm Beach, Fla. 33408

[21] Appl. No.: 156,287

[22] Filed: Feb. 16, 1988

[51] Int. Cl.$^4$ .............................................. H02P 7/40
[52] U.S. Cl. ................................ 318/770; 318/442; 318/729; 318/814; 324/158 MG
[58] Field of Search ............... 318/729, 442, 770, 814; 310/68 D; 324/158 MG; 307/141, 141.4

[56] References Cited

U.S. PATENT DOCUMENTS

| | | | |
|---|---|---|---|
| 1,978,581 | 10/1934 | Johnson | 318/729 |
| 2,040,508 | 5/1936 | Thompson | 318/701 |
| 4,390,219 | 6/1983 | Beehler | 310/71 |

OTHER PUBLICATIONS

Rosenberg, R., *Electric Motor Repair*, 2nd Ed., Holt, Rinehart and Winston, 1970, pp. 76-77.

Primary Examiner—David Smith, Jr.
Attorney, Agent, or Firm—Jack N. McCarthy

[57] ABSTRACT

A motor having a capacitor in series with its coil permits the motor to operate at a higher voltage or range of voltages over its design voltage. A method determines the correct value of a capacitor to change the design voltage of a motor to a different operating voltage. A receptacle can be used to receive capacitors of different values to vary the operating voltage of a motor. The receptacle is provided with a capacitor holding device which is marked with the operating voltage set by the capacitor. A timer clock has a motor of a design voltage which can be changed to a plurality of operating voltages. The timer clock can have the receptacle accessible from the exterior with a cover having the operating voltage marked thereon.

25 Claims, 3 Drawing Sheets

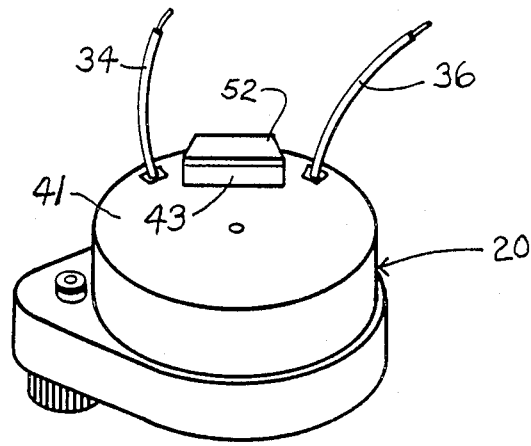
Fig. 4
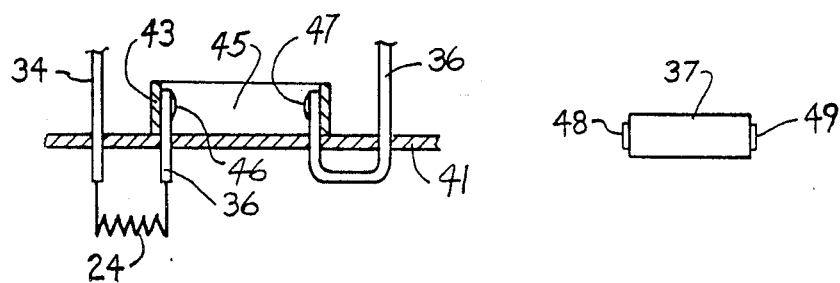
Fig. 5
Fig. 6

MULTI-VOLTAGE MOTOR AND TIMER CLOCK

TECHNICAL FIELD

This invention relates to means for changing alternating current motors that are designated to run at one voltage so that they can be run at a higher voltage level, or in an extended range of voltages. This construction is especially useful for synchronous timer clock motors for home use where there are usually two voltage sources provided; for example, 110 volts and 220 volts.

BACKGROUND ART

Applicant knows only of the use of a resistor or transformer to provide an expanded use of an alternating current motor, especially in timer clocks. These devices did not provide the results desired; they were limited to use for increasing the voltage to a single voltage. The resistor presents an undesirable heat problem and the transformer adds a costly item to a timer clock.

DISCLOSURE OF INVENTION

An object of this invention is to provide a method for increasing the voltage or range of voltages at which an electric motor will satisfactorily operate above its design voltage.

Another object is to provide timer clocks which can be used at a wide range of voltages, or at a plurality of specific voltages, at a reasonable cost.

A further object of this invention is to provide a timer clock having a designed operating voltage with an uncomplicated means for changing its operating voltage.

It is an object of this invention to provide means for changing an alternating current motor designed to operate at a small range of voltages; for example, 3 or 4 volts on each side of 24 volts, so that it will operate at a higher small range of voltages; for example, 15 to 25 volts on each side of 110 volts. A preselected capacitor is placed in at least one input lead having a value to alter the current flow through the motor coil so that when the increased voltage is used, the current is at an acceptable level to provide the required speed and output torque.

It is another object of this invention to provide means for changing an alternating current motor designed to operate at 110 volts, plus or minus small voltage amounts, so that the motor will operate at its designed voltage of 110 volts and through a range to a higher value such as 240 volts. A timer clock having such a motor could be used with a 110 volt source or a 240 volt source and obtain proper clock operation. At least one input lead to the motor has a capacitor placed in series therein with the motor coil. The capacitor is made of a selected value to make the current acceptable to the coil to provide the required speed and output torque.

It is a further object of this invention to provide means for changing an alternating current motor, having two input leads, designed to operate at one rated voltage such as at 120 volts, plus or minus small voltage amounts, so that it will also operate at a second higher voltage, such as 240 volts. This is done through a third input lead having a capacitor of a preselected value, said third input lead being connected to the connection of one other input lead to one end of the coil of the motor. The use of a fourth input lead in the same manner, having a capacitor of another preselected value, will permit a third operating voltage to be used. When a decision is made concerning which voltage is to be actually used, the proper input lead is connected to complete the input voltage connection through the coil of the motor.

Another object of this invention is to select an off-the-shelf electric motor having a design voltage and place a capacitor of a predetermined value in series with the coil of the motor, to expand the usefulness of the motor by increasing its acceptable voltage, increasing a range of acceptable voltages, or adapting the motor for two or more specific voltages.

A further object of this invention is to provide a timer clock which can operate at a plurality of voltages usually obtainable for home use.

It is an object of this invention to provide a method for determining the farad value of a capacitor to be placed in series with a coil of an alternating current electric motor to change its design voltage to a desired operating voltage.

It is an object of this invention to provide an alternating current motor having a housing with a receptacle, said receptacle having spaced contacts therein, to receive a capacitor with two contacts and place it in series with its coil. The capacitor will permit the motor to run above its design voltage.

It is a further object of this invention to provide a timer clock with a receptacle in its housing for receiving a capacitor to set the voltage at which the timer clock will operate, said receptacle having two contacts forming an opening in a line connecting an input connector to one end of the coil of the motor in the timer clock. A cover on the receptacle identifies the allowable operating voltage set by the capacitor.

It is another object of the invention to provide a capacitor with identification to correspond to the increased operating voltage or voltages which can be used.

It is an object of the present invention to build a motor to a design voltage and then set its operating voltage at a later time by inserting a selected capacitor therein when the voltage to be used is known. This capability reduces inventory, since one motor can be used for three different voltages where three different motors have been required for three different voltages before.

BRIEF DESCRIPTION OF DRAWINGS

FIG. 4 is a perspective view of an alternating current synchronous motor having a housing with a receptacle for receiving a capacitor;

FIG. 5 is a sectional view through the housing of FIG. 4 showing the receptacle with its inner contacts and connected electrical lines, the motor coil being in series in one electrical line;

FIG. 6 is a side view of a capacitor for insertion into the receptacle of FIG. 5.

BEST MODE FOR CARRYING OUT THE INVENTION

Figure 1:
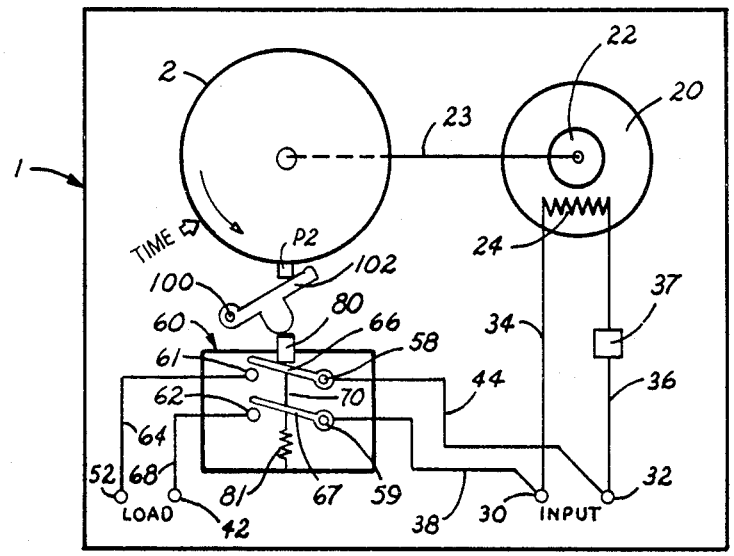
FIG. 1 is a schematic drawing of a timer clock having a housing showing the electric circuitry between the INPUT connectors and LOAD connectors with a double-pole, single throw switch therebetween actuated by a large time dial and the electric circuitry between the INPUT connectors and the coil of the alternating current synchronous motor, said motor and speed reduction means turning said large time dial.

As set forth in FIG. 1, a timer clock 1 is shown having a large time dial 2 visibly mounted for rotation, with two INPUT connectors 30 and 32 for receiving current from an outside voltage supply and two LOAD connectors 42 and 52. A similar timing device is shown and described in U.S. Pat. No. 4,029,918.

An electric synchronous clock motor 20 is located in said timer clock 1 and its output shaft is connected by connecting means 23 to said time dial 2 so that it rotates the dial one revolution for every twenty-four (24) hours. Said motor 20 has an armature 22 mounted therein for rotation connected to the output shaft (conventionally through a gear train) and a coil 24 positioned to activate the armature 22 to turn the time dial 2.

INPUT connector 32 is connected to one end of the coil 24 of the motor 20 by line 36 having a capacitor 37 located therein, and INPUT connector 30 is connected to the other end of the coil 24 by a line 34. INPUT connectors 30 and 32 are connected to the LOAD connectors 42 and 52 respectively, through a double-pole, single throw switch 60.

The double-pole, single throw switch 60 has two spaced apart input contacts 58 and 59 and two spaced apart output contacts 61 and 62. A line 44 connects INPUT connector 32 to input contact 58 and a line 38 connects INPUT connectors 30 to input contact 59, while a line 64 connects output contact 61 to LOAD connector 52 and a line 68 connects output contact 62 to LOAD connector 42. A pivotable connector 66 is pivotally connected at one end to input contact 58 for contacting output contact 61 and a pivotable connector 67 is pivotally connected at one end to input contact 59 for contacting output contact 62. Pivotable connectors 66 and 67 are interconnected by a connecting means 70 so that they move together, and are both biased to a normally open position by a spring 81, and both contact output contacts 61 and 62 when in a closed position.

The time dial 2, through a pin P2 fixed to the outer circumference, a lever 102 pivoted at 100, and a slideable piston, or button, 80 in the switch housing, contacts and pivots the joined pivotable connectors 66 and 67 to engage contacts 61 and 62, respectively, at the time setting of the pin P2 and keeps them closed for the width of the pin. The pin P2 at the desired time moves the free end of lever 102 downwardly with part of said lever 102 contacting the slideable button 80 which in turn closes both pivotable connectors 66 and 67 against output contacts 61 and 62, respectively, connecting INPUT connectors 30 and 32 to LOAD connectors 42 and 52.

A capacitor 37 is added when the motor 20 being used is one designed for a lower voltage than that available, or one desires to increase the upper range of voltage acceptable to the motor 20. For example, if the timer clock 1 had a motor 20 designed for 110 volts and a 200 volt supply was available, a capacitor 37 of a preselected value would be placed in line 36 to make the current, from the use of the 220 volt supply, acceptable to the coil 24 to provide the required speed and output torque. As is well known in the art, any capacitor used must be serviceable for the voltage imposed across it. When voltages are referred to, they are RMS voltages as measured by a standard voltmeter.

Further, if the timer clock 1 has a motor 20 designed for 110 volts and it is desired to make it useful in a range of 110 volts to 220 volts, a preselected capacitor 37 would be added to the circuitry to provide an acceptable current to the coil 24 through the range of voltages to obtain the required speed and output torque.

In FIG. 1, assuming the motor 20 is designed for 120 volts and it is desired to make it usable with both 120 volts and 240 volts, and any range inbetween, a capacitor 37 of proper size has to be added in line 36 to make this adjustment. The proper size of capacitor 37 is found empirically as follows:

METHOD I (1) apply design voltage of 120 volts to INPUT connectors 30, 32 to verify operation;

(2) add small known capacitance to line 36;

(3) apply voltage of 120 volts to INPUT connectors 30, 32 to determine if motor will start and run at required speed against the required output torque;

(4) A—if motor does not start and run as desired, add capacitance by small increments until it does;

B—if motor does start and run as desired, reduce capacitance increments until it does not and then use the previous acceptable capacitance amount;

(5) apply voltage of 240 volts to INPUT connectors 30, 32;

(6) measure the voltage across the coil 24 to determine that it is a value which does not exceed the maximum design voltage of the motor for proper heat dissipation.

In a test program, an off-the-shelf fractional H.P. synchronous electric motor for use, for example, in a timer clock as described in U.S. Pat. No. 4,029,918 was used. The motor was designed for use with 115 volts, and marked 60 Hz and 1.4 W. A typical design voltage range for this type of motor would be 90 volts to 130 volts. A capacitor of 0.2 $\mu$F was first placed in line 36, representing capacitor 37 and the voltages of 120 and 240 placed in turn across INPUT connectors 30, 32. Capacitors in increments of 0.1 $\mu$F were added to the 0.2 $\mu$F to make three test runs. The results of these test runs are set forth below:

| Series Capacitor | (1) Voltage applied across coil and capacitor | (2) Voltage measured across coil | (3) Percentage of Voltage (2) to (1) |
|---|---|---|---|
| 0.2 $\mu$F | 120 V | 68 V | 57% |
|  | 240 V | 95 V | 41% |
| 0.3 $\mu$F | 120 V | 87 V | 73% |
|  | 240 V | 125 V | 52% |
| 0.4 $\mu$F | 120 V | 95 V | 79% |
|  | 240 V | 162 V | 68% |

From the above data, the 0.3 $\mu$F capacitor 37 produces a larger percentage of the applied voltage at the motor coil 24 of 120 volts while producing a lower percentage of the applied voltage of 240 volts. This result is desired to provide acceptable operating voltages at the motor coil 24 with applied voltages of 120 or 240 volts or any voltage therebetween. It can be seen that the 0.3 μF capacitor produced values of 87 volts and 125 volts, acceptable operating voltages. However, if a capacitor 37 to use only with an operating voltage of 240 volts was desired, the tests should be expanded using capacitances between 0.2 μF and 0.3 μF to arrive at 120 volts. From tests made, it would appear that a capacitance of 0.28 μF would be a value to select.

In FIG. 1, assuming the motor 20 is designed, for example, for use at 120 volts and it is desired to make it usable only, for example, at 240 volts, the proper size of capacitor 37 is found empirically as follows:

METHOD II (1) apply design voltage of 120 volts to INPUT connectors 30, 32 to verify operation;
(2) add small known capacitance to line 36;
(3) apply desired voltage of 240 volts to INPUT connectors 30, 32;
(4) measure the voltage across the coil 24;
(5) A—if the voltage is an acceptable value in the design range of the motor tested, that capacitance can be used;
B—if the voltage is not an acceptable value in the design range of the motor tested, capacitance can be added or subtracted until an acceptable voltage is obtained.

In a second test program, an off-the-shelf fractional H.P. synchronous electric motor for use, for example, in a timer clock as described in U.S. Pat. No. 4,029,918 was used. The motor was designed for use with 24 volts, and marked 60 Hz and 0.4 W. A typical design voltage range for this type of motor would be 19 volts to 29 volts. A capacitor of 0.2 μF was first placed in line 36, representing capacitor 37, and voltages of 125 and 255 placed in turn across INPUT connectors 30, 32. Capacitors in increments of 0.1 μF were added to the 0.2 μF capacitor to make a total of three test runs. The results of these test runs are set forth below:

| Series Capacitor | (1) Voltage applied across coil and capacitor | (2) Voltage measured across coil |
|---|---|---|
| 0.2 μF | 125 V | 11.5 V |
|  | 255 V | 18 V |
| 0.3 μF | 125 V | 15 V |
|  | 255 V | 23.5 V |
| 0.4 μF | 125 V | 20 V |
|  | 255 V | 28 V |

In the above data, it can be seen that the 0.4 μF capacitor produced values of 20 volts and 28 volts across the motor coil 24 at input voltages of 125 volts and 255 volts, respectively, across the motor coil 24 and capacitor 37.

In FIG. 1, assuming the motor 20 is designed for use at 24 volts and it is desired to make it usable at only 125 volts or 255 volts or in a range from 125 volts to 255 volts, Methods I and II would apply using these voltage values. In the above data of the second test program, it can be seen that the 0.4 μF capacitor produced acceptable values of 20 volts and 28 volts across the motor coil 24 at input voltages of 125 volts and 255 volts, respectively, across the motor coil 24 and capacitor 37 and would be picked to change the usable voltage from 24 volts to a desired range of 125 volts to 255 volts. If a change to only a usable voltage of 125 were desired, the 0.4 μF capacitor could still be used; however, to arrive at a closer value to 24 volts, the test should be run from 0.42 μF to 0.5 μF. If a change to only a usable voltage of 255 volts were desired, the 0.3 μF capacitor would be used since it produces a voltage across the motor coil of 23.5 volts, very close to the design voltage of 24 volts.

In FIG. 1, assuming the motor 20 is designed for 24 volts and it is desired to make the motor usable with two larger operating voltages, and any range inbetween, a capacitor 37 of proper size has to be added in line 36 to make this adjustment. The proper size of a capacitor 37 can be found empirically as follows:

METHOD III (1) apply design voltage of 24 volts to INPUT connectors 30, 32 to verify operation;
(2) add small known capacitance to line 36;
(3) apply voltage of smaller of the two larger operating voltages desired to INPUT connectors 30, 32 to determine if motor will start and run at required speed against the required output torque;
(4) A—if motor does not start and run as desired, add capacitance by small increments until it does;
B—if the motor does start and run as desired, reduce capacitance increments until it does not and then use the previous acceptable capacitance amount;
(5) apply voltage of larger of the two larger operating voltages to INPUT connectors 30, 32;
(6) measure the voltage across the coil 24 to determine that it is a value which does not exceed the maximum design voltage of the motor for proper heat dissipation;

A third test program was conducted on an off-the-shelf fractional H.P. synchronous alternating current electric motor for use, for example, in a timer clock. The motor was designed for use with 24 volts, and marked 60 cycles and 5 W. To start the test, 0.2 μF capacitance was used with 120 volts applied across the coil 24 and capacitance 37, and 0.4 volts was measured across coil 24. Capacitance had to be increased a significant amount to minimize the 0.4 reading to an acceptable voltage for a motor design of 24 volts. After trying 1.5 μF and 3.0 μF, which provided low voltage readings across the coil 24, the following capacitances were recorded for operating voltages of 120 and 239 placed in turn across INPUT connectors 30, 32:

| Series Capacitor | Voltage Applied across coil and capacitor | Voltage Measured across coil |
|---|---|---|
| 4.8 μF | 120 V | 18.2 V |
|  | 239 V | 26.9 V |
| 5.0 μF | 120 V | 18.9 V |
|  | 239 V | 27.5 V |
| 5.2 μF | 120 V | 19.4 V |
|  | 239 V | 28.2 V |
| 5.4 μF | 120 V | 20.0 V |
|  | 239 V | 29.0 V |
| 6.0 μF | 120 V | 23.1 V |
|  | 239 V | 34.0 V |

In the data above, it can be seen that the 5.4 μF capacitor produced values of 20 volts and 29 volts across the motor coil 24 at input voltages of 120 volts and 239 volts, respectively, across the motor coil 24 and capacitor 37, both acceptable voltages for this motor. However, if an increase of voltage to only 120 volts was desired, it can be seen that a capacitance of 6.0 μF would be used producing 23.1 volts. If an increase of voltage to only 239 V was desired, tests of lower value capacitances would have to be made if a voltage closer to 24 volts was desired.

If it is desired to increase the range of voltage of a specific motor having a design voltage to a range between two larger voltages, it may be that this result cannot be obtained by a single capacitor because the ratio of voltage drops across the capacitor does not permmit this. In this event, other motors each having more turns on its coil should be tried. It may be necessary to provide a capacitor for each voltage desired and make a selection including the proper capacitor for the voltage selected. For example, in FIG. 3, the line 36B could be provided with a capacitor for one of the voltages while capacitor 37B would provide the other capacitor.

Figure 2:
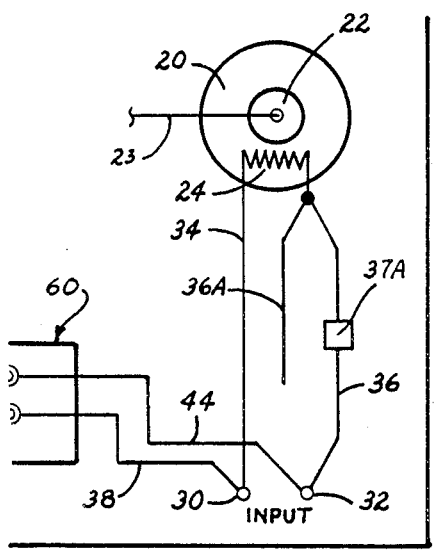
FIG. 2 is a partial schematic drawing of a first modification of FIG. 1 wherein said coil of the alternating current motor is provided with two connectors for internally changing the design voltage of the timer clock.

In FIG. 2, assuming the motor 20 is designed for use at 120 volts and it is desired to make it usable at only 120 volts, or only 240 volts, in, for example, a timer clock 1, two lines 36 and 36A are provided in the timer clock 1 connected to one end of the motor coil 24. Line 36 has a capacitor 37A therein while line 34 provides a direct connection. The capacitor 37A has a capacitance as determined above in METHOD II for the use of 240 volts. When "on the shelf", the line 36 is connected to INPUT connector 32 since it is the line which can receive the higher voltage and not damage the timer clock motor 20 in the event that 240 volts is applied by someone who has not verified the voltage of the source. However, when the voltage to be used is known, if it is 120 volts, the line 36 is disconnected and the line 36A connected in place thereof.

In FIG. 2, assuming the motor 20 is designed for use at 24 volts and it is desired to make it also usable at only 120 volts or only 240 volts, a second line 36 (not shown) is added with a second capacitor 37A (not shown) therein. The capacitor 37A, shown in FIG. 2, has a capacitance for the use of 240 volts and the second capacitor 37A (not shown in FIG. 2) has a capacitance for the use of 120 volts. The line 36, shown in FIG. 2, is connected to INPUT connector 32 since it is the line which can receive the higher voltage, as described above in FIG. 2. It is noted that the three voltages, 24 volts, 120 volts, and 240 volts, are used to a great extent for timer clocks, especially in the field of irrigation.

Figure 3:
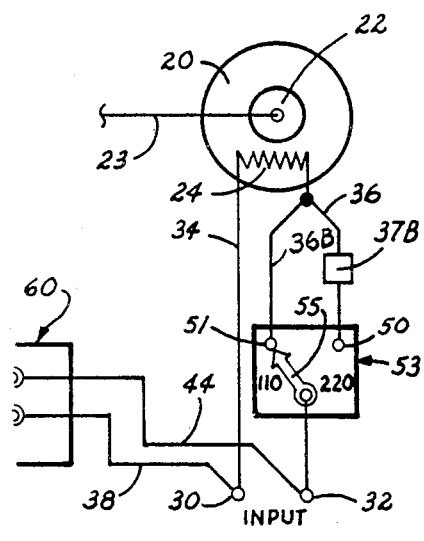
FIG. 3 is a partial schematic drawing of a second modification of FIG. 1 wherein a selector switch is provided to externally change the design voltage of the timer clock.

In FIG. 3, a timer clock 1 having a motor 20 with a design voltage of 120 volts is constructed to be used with 120 volts or 240 volts. Two lines 36 and 36B, provided for the timer clock 1, are connected to one end of the motor coil 24. Each line 36 and 36B is connected to a terminal 50 and 51, respectively, of a switch 53. Line 36 has a capacitor 37B therein, the capacitor 37B having a capacitance for the use of 240 volts. Switch 53 has a pivotable connector 55 connected to INPUT connector 32. Movement of pivotable connector 55 to either terminal 51 or 50 will change the acceptable voltage from 110 volts to 220 volts, respectively. When not being used, such as "on the shelf", the switch 53 should be set for 220 volts to prevent damage to the clock timer 1 by someone taking the clock timer 1 and placing 220 volts across the terminals 30, 32. Then if it is desired to have a timer clock 1 usable at 120 volts, switch 53 has its pivotable connector 55 directed to 120 volts.

In FIG. 3, if the motor 20 has a design voltage of 24 volts and it is desirable to have it also operate at 120 volts or 240 volts, a switch 53 can have a third terminal (not shown) between terminals 50 and 51 to accommodate 120 volts. A second line 36 (not shown) is added, with a second capacitor 37B (not shown) connected between the one end of the motor coil 24 and the third terminal (not shown). Movement of pivotable connector 55 to terminal 51, the third terminal (not shown) or terminal 50 will provide the selection of one of three acceptable voltages, 24 volts, 120 volts, or 240 volts.

When the voltage range of a motor 20 is increased, the maximum voltage and resulting current increase through the motor coil should not be increased past the saturation of the coil field and rotor. This would not productively contribute to additional motor torque and simply produce excessive heating.

In FIG. 4, an alternating current synchronous motor 20 is shown having a housing 41 with a receptacle 43. Receptacle 43 has an opening 45 for receiving a capacitor 37. The opening 45 has two contacts 46 and 47 therein, one contact 46 is connected by a section of line 36 to one end of motor coil 24, while the other contact 47 is connected by the remainder of line 36 to INPUT connector 32. The opening 45 of the receptacle 43 can receive a capacitor 37 (see FIG. 6) having electrical contacts 48 and 49 for contacting receptacle contacts 46 and 47, respectively. It can be seen that placing a capacitor 37 in the opening 45 will set the operating voltage of the motor 22, as described hereinbefore, at an increased value from its design voltage as determined by its coil 24, the voltage being set by the value of the capacitor selected. To set the design voltage of the motor 22, the lowest voltage obtainable, a solid connector is placed in the opening 45.

Means are provided to retain the capacitor 37 in the opening 45. This can be by a cover 52 fixed over the opening 45 on the receptacle 43. The cover 52, or other visible holding means, can have the increased operating voltage readable thereon as set by the value of the capacitor 37. The capacitor 37 itself can be marked to show the operating voltages allowed by the insertion of that particular capacitor 37. Mating contours on the contacts 46, 47 of the receptacle 43 and contacts 48, 49 of the capacitor 37, such as a small projection in one and a dimple in the other, could provide retention, by a "snap-in" action.

The opening 45 could be much longer than a capacitor 37 with its contacts 46, 47 being provided with means for attaching a wire thereto, such as a small screw. Then a capacitor 37 of the type having two wires extending as terminals could be fixed therein. The opening 45 could be contoured to receive a wafer-shaped capacitor, or any shape capacitor desired.

Figure 7:
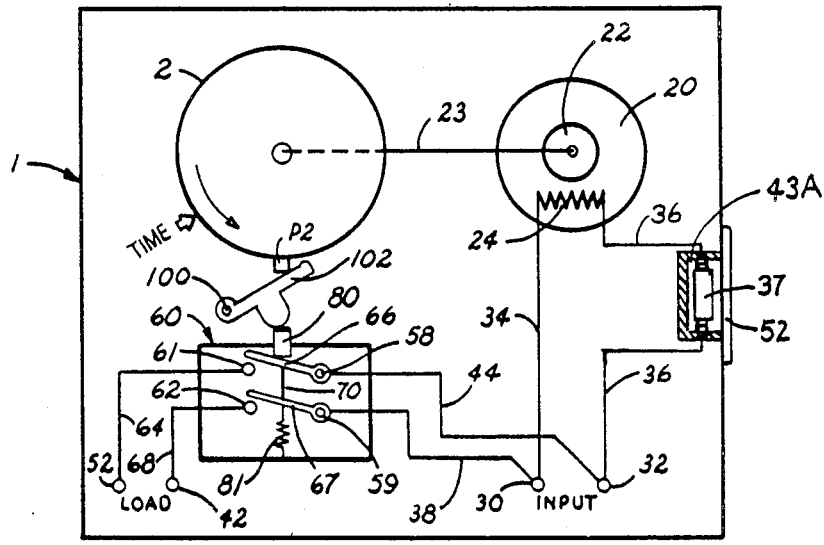
FIG. 7 is a view similar to FIG. 1 showing a receptacle placed on a timer clock housing for easy access to receive a capacitor for placing in series with an alternating current synchronous motor which operates the clock time dial.

To provide a timer clock 1 having a motor 22 with a single design voltage, with the capability of easily increasing its voltage, a receptacle 43A can be provided in the side of the timer clock (see FIG. 7) for receiving a capacitor 37. The receptacle 43A can be made as receptacle 43 and having a cover 52. It can be seen that if the timer clock 1 of FIG. 7 is installed, and has a capacitor 37 of the proper value in place in the receptacle 43A for the proper operating voltage of the clock, and a motor for replacement becomes necessary, a standard motor can be provided for all clocks regardless of the operating voltage, since the installed clock housing has the voltage selection capacitor installed on it.

As set forth in the description, the proper series capacitor 37 was determined empirically. By design voltage, a range of RMS voltages is meant, that will provide adequate current through the motor coil to give the design output torque at the low voltage of the range, and not cause excessive heating at the high voltage of the range. The non-linear voltage dropping effect of a capacitor in series with a motor coil and the fact that capacitance absorbs no energy, permit a unique arrangement for arriving at a reasonable way to increase the voltage or voltage range of an alternating current electric motor.

Methods I, II and III can be used with other design voltages and other desired voltages.

It is to be understood that the invention is not limited to the specific embodiment herein illustrated and described, but may be used in other ways without departing from its spirit as defined by the following claims.

I claim:

1. A method for use in determining a capacitance to be placed in series with the coil of an alternating current electric motor, having a small range of acceptable voltages on each side of a design voltage, to increase the range of voltages at which the motor can operate including two known voltages:
   (1) place a small known capacitance in series with said coil;
   (2) apply a first increased known operating voltage across said coil and capacitance;
   (3) determine that the motor started and ran at required speed against the required output torque, if it did not add capacitance until it does;
   (4) measure the voltage across the coil to determine that the voltage is an acceptable value compared to the design voltage;
   (5) apply a second increased known operating voltage across said coil and capacitance;
   (6) measure the voltage across the coil to determine that it is a value which does not exceed the maximum design voltage of the motor for proper heat distribution;
   (6A) if the voltage in step (6) is a value below maximum acceptable voltage, then the capacitance of step (5) is a capacitance that can be used to increase the range of voltages at which the motor can operate;
   (6B) if the voltage in step (6) is a value above maximum acceptable voltage, then the capacitance of step (5) is a capacitance that cannot be used to increase the range of voltages at which the motor can operate.

2. A method for use in determining a capacitance to be placed in series with the coil of a fractional H.P., synchronous, alternating current, electric motor having a small range of acceptable voltages on each side of a ddesign voltage, to provide a large range of voltages at which the motor can operate including two acceptable known high to low operating voltages having a ratio of approximately 2 or more;
   (1) place a small known capacitance in series with said coil;
   (2) apply a first known operating voltage across said coil and capacitance;
   (3) determine that the voltage across the coil is an acceptable value compared to the design voltage;
   (3 A) if the voltage of step (2) is unacceptable change the capacitance until it is acceptable;
   (4) apply a second known operating voltage across said coil and capacitance which has a ratio of approximately 2 or more with said first known operating voltage;
   (5) determine that the voltage across the coil is an acceptable value compared to the design voltage;
   (5A) if the voltage of step (5) is an acceptable value compared to the design voltage the capacitance in step (4) can be used with the motor to operate at a large range of operating voltages including the voltages of step (2) and step (4) having a ratio of approximately 2 or more;
   (5B) if the voltage of step (5) is not an acceptable value compared to the design voltage the capacitance in step (4) cannot be used with the motor to operate at a large range of operating voltages including the voltages of step (2) and step (4) having a ratio of approximately 2 or more.

3. A method as set forth in claim 2 wherein said two known voltages are approximately 100 volts apart, in step (4) make the second known operating voltage approximately 100 volts from the first known operating voltage.

4. A method as set forth in claim 3 wherein said two known voltages are approximately 100 volts and approximately 220 volts;
   in step (2) make the first known operating voltage approximately 110 volts;
   in step (4) make the second increased known operating voltage approximately 220 volts.

5. A method as set forth in claim 4 wherein said design voltage is approximately 24 volts.

6. A method for use in determining a capacitance to be placed in series with the coil of a fractional H.P., synchronous, alternating current, electric motor having a small range of acceptable voltages on each side of a design voltage, to provide a large range of voltages at which the motor can operate including two acceptable known operating voltages approximately 100 volts apart:
   (1) place a small known capacitance in series with said coil;
   (2) apply a first known operating voltage across said coil and capacitance;
   (3) (A) if motor does not start and run as desired, change capacitance by small increments until it does;
   (B) if motor does start and run as desired, change capacitance until it does not, and then use the previous capacitance;
   (4) apply second known operating voltage across said coil and capacitance which is at least approximately 100 volts from the first known operating voltage;
   (5) measure the voltage across the coil to determine that it is within the range of acceptable voltages for the design voltage;
   (5A) if the voltage in step (5) is within the range of acceptable voltages for the design voltage the capacitance in step (4) can be used with the motor to operate at a large range of voltages including the voltages of step (2) and step (4) which are approximately 100 volts apart;
   (5B) if the voltage in step (5) is not within the range of acceptable voltages for the design voltage the capacitance in step (4) cannot be used with the motor to operate at a large range of voltages including the voltages of step (2) and step (4) which are approximately 100 volts apart.

7. A method as set forth in claim 6 wherein said design voltage is approximately 24 volts.

8. A method as set forth in claim 7 wherein said two known voltages are approximately 110 volts and approximately 220 volts;

in step (2) make the first known operating voltage approximately 110 volts;

in step (4) make the second known operating voltage approximately 220 volts.

9. A timer clock, said clock having a housing, a time dual mounted for rotation on said housing, a fractional H.P. synchronous alternating current motor having a known design voltage, means connecting said motor to said time dial for rotating it, said motor having a coil means with two ends, two INPUT connectors, a receptacle having two electrical contacts therein for receiving a capacitor or a direct connector therebetween to provide said timer clock with different operating voltages, said direct connector providing said timer clock with an operating voltage of the design voltage of the motor, said capacitor having a predetermined value providing said timer clock with a large range of operating voltages higher than said design voltage of the motor when it is placed in series with said coil means, an electric connector connecting one INPUT connector to one electrical contact in said receptacle, a second electric connector connecting the other electrical contact in said receptacle to one end of said coil means, a third electrical connector connecting said other INPUT connector to said other end of said coil means placing said receptacle in series with said coil means, said design voltage being approximately 24 volts, and said large range of operating voltages includes voltages of approximately 110 volts to approximately 220 volts.

10. A combination as set forth in claim 9 wherein said capacitor has a predetermined value in the range of 0.1 $\mu F$ to 6.0 $\mu F$.

11. A combination as set forth in claim 10 wherein said capacitor has a predetermined value of approximately 0.4 $\mu F$.

12. A combination as set forth in claim 9 wherein said receptacle is in said housing.

13. A combination as set forth in claim 9 wherein said motor has a second housing, said receptacle being located in said second housing.

14. A combination as set forth in claim 9 wherein said coil means is a single coil.

15. In combination, a fractional H.P., synchronous, alternating current, electric motor; said motor having a coil means with two ends; an armature mounted for movement by said coil means; said armature having an output means for providing an output connection; capacitor means with two ends; one end of said capacitor means being connected to one end of said coil means placing them in series; a first power input lead connected to the other end of said coil means; a second power input lead connected to the other end of said capacitor means; said capacitor means having a predetermined value which will provide a non-linear operating characteristic with the motor and permit the motor to operate at a large range of operating voltages across the first and second power input leads, said capacitor means at a high operating voltage drops a larger percentage of the operating voltage across the capacitor means than at a low operating voltage, said capacitor means placing an acceptable voltage drop across the coil means from any of the operating voltages in the large range, said large range of operating voltages having two acceptable known high to low operating voltages having a ratio of approximately 2 or more.

16. A combination as set forth in claim 15 wherein said large range of operating voltages includes voltages of approximately 110 volts and approximately 220 volts.

17. A combination as set forth in claim 16 wherein said electric motor has a design voltage of approximately 24 volts.

18. A combination as set forth in claim 16 wherein said electric motor has a design voltage of approximately 110 volts.

19. A combination as set forth in claim 16 wherein said capacitor value is in the range of approximately 0.2 $\mu F$ and 6.0 $\mu F$.

20. A combination as set forth in claim 16 wherein said coil means is a single coil.

21. In combination, a fractional H.P., synchronous, alternating current, electric motor having a design voltage with a small range of acceptable high to low operating voltages, said motor having a coil, an armature mounted for movement by said coil, said armature having an output means for providing an output connection; a capacitor located in series with said coil, said capacitor having a predetermined value so that when it is placed in series with said coil the operating voltage of said electric motor is increased to a range of high to low operating voltages having a ratio of approximately 2 or more.

22. A combination as set forth in claim 21 wherein said increased range of high to low operating voltages is approximately 100 volts.

23. A combination as set forth in claim 21 wherein the value of said capacitor is in the range of approximately 0.2 $\mu F$ to 6.0 $\mu F$.

24. A combination as set forth in claim 21 wherein said motor has a housing, said housing having a receptacle for receiving a capacitor, said capacitor being located in said receptacle.

25. A combination as set forth in claim 15 wherein said electric motor has a housing, said housing having a receptacle for receiving said capacitor means, said capacitor means being located in said receptacle.

* * * * *